(12) United States Patent
Dietrich

(10) Patent No.: US 8,204,453 B2
(45) Date of Patent: Jun. 19, 2012

(54) METHOD, APPARATUS AND COMMUNICATION UNIT

(75) Inventor: Frank Dietrich, Fürstenfeldbruck (DE)

(73) Assignee: Intel Mobile Communications GmbH, Neubiberg (DE)

( * ) Notice: Subject to any disclaimer, the term of this patent is extended or adjusted under 35 U.S.C. 154(b) by 973 days.

(21) Appl. No.: 12/194,640

(22) Filed: Aug. 20, 2008

(65) Prior Publication Data

US 2010/0048148 A1 Feb. 25, 2010

(51) Int. Cl.
*H04B 1/02* (2006.01)
(52) U.S. Cl. ......... 455/101; 455/118; 455/129; 375/267
(58) Field of Classification Search .......... 455/101–104, 455/117–121, 129; 375/260, 267, 299
See application file for complete search history.

(56) References Cited

U.S. PATENT DOCUMENTS

| | | | |
|---|---|---|---|
| 7,629,902 B2 * | 12/2009 | Zhang et al. | 341/106 |
| 2008/0043865 A1 | 2/2008 | Kim et al. | |
| 2008/0069281 A1 | 3/2008 | Olesen et al. | |
| 2008/0080459 A1 | 4/2008 | Kotecha et al. | |
| 2008/0080545 A1 * | 4/2008 | Wong et al. | 370/437 |
| 2008/0260059 A1 * | 10/2008 | Pan | 375/260 |

OTHER PUBLICATIONS

"Ergodic Capacity of MIMO Channels with Statistical Channel State Information at the Transmitter", Mario Kiessling, Joachim Speidel and Markus Reinhardt, Smart Antennas, Mar. 2004, pp. 79-86.
3GPP TS 36.211, V1.3.0 12 (2007-0809), $3^{rd}$ Generation Partnership Project; Technical Specification Group Radio Access Network; Evolved Universal Terrestrial Radio Access (E-UTRA); Physical Channels and Modulation, 55 pgs.
"Limited Feedback Unitary Precoding for Spatial Multiplexing Systems", David J. Love and Robert W. Heath, IEEE Transactions on Information Theory, vol. 51, No. 8, Aug. 2005, pp. 2967-2976.
"MIMO Wireless Linear Precoding", Mai Vu and Arogyaswami Paulraj, Accepted to IEEE Signal Processing Magazine, Submitted Feb. 2006, revised Nov. 2006 and Dec. 2006, 39 pgs.

* cited by examiner

*Primary Examiner* — Nhan Le
(74) *Attorney, Agent, or Firm* — Eschweiler & Associates, LLC

(57) ABSTRACT

A method, an apparatus and a communication unit for generating precoding feedback information in a multiple frequency radio transmission system are disclosed. A rank for precoding matrices, wherein the rank is constant over the multiple frequencies, is selected and a plurality of precoding matrices having the selected rank are selected. A different precoding matrix is selected for each frequency subset of the multiple frequencies.

10 Claims, 3 Drawing Sheets

METHOD, APPARATUS AND COMMUNICATION UNIT

FIELD OF THE INVENTION

This invention relates to methods for generating feedback information in radio transmission systems, devices for generating feedback information in radio transmission systems and communication units in radio transmission systems.

BACKGROUND OF THE INVENTION

Multiple-input multiple-output (MIMO) communication systems use multiple data streams. Precoding can be provided to manipulate multiple data streams in MIMO communication systems by applying preceding matrices to the data streams.

DETAILED DESCRIPTION OF THE INVENTION

Figure 1:
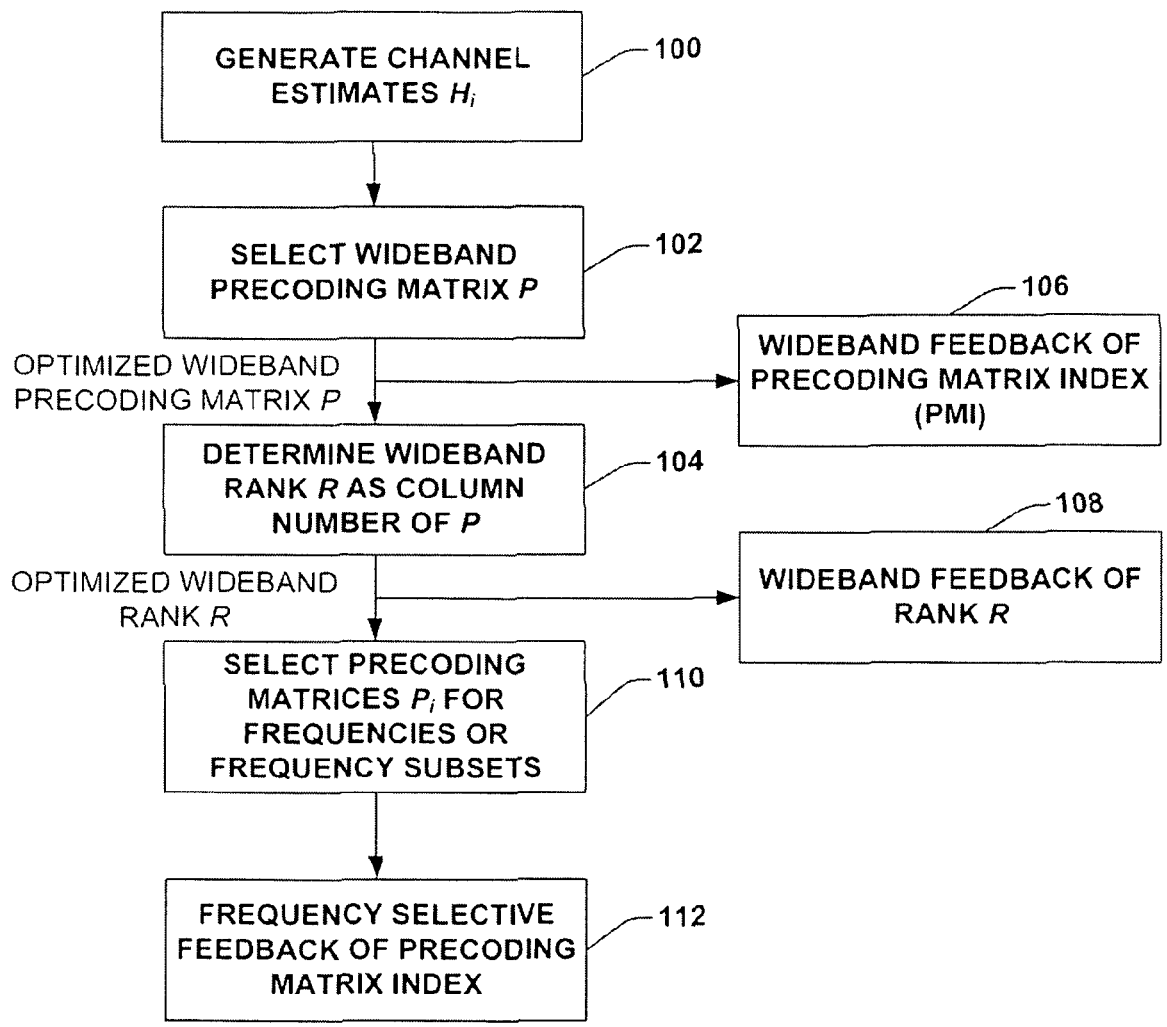
FIG. 1 schematically illustrates a method according to one exemplary embodiment.

The following embodiments of the invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Methods and apparatuses as described herein may be utilized for radio transmission systems, in particular Multiple Input Multiple Output (MIMO) systems operating in Orthogonal Frequency Division Multiplex (OFDM) mode in one embodiment. The apparatuses disclosed may be embodied in baseband segments of devices used for reception of radio signals, such as mobile phones, handheld devices and/or mobile radio receivers or in mobile radio base stations, in particular radio transmitters. The described apparatuses may be employed to perform methods as disclosed herein, although those methods may be performed in any other way as well, in particular outside baseband chips of mobile radio receivers and/or mobile phones.

A radio transmission link, in particular an OFDM communication link may be operable with an amount of N subcarriers, with N being an integer equal to or greater than 1. Subcarriers of such radio transmission systems may comprise a single frequency each. They may also comprise a plurality of frequencies, for example adjoining frequencies in a frequency range or any arbitrary subset of frequencies. In one embodiment, the number of frequencies included in a subcarrier may not be limited to any number of frequencies. For transmission of radio signals, such as OFDM radio signals, $N_T$ transmit antennas may be used, for example in transmission diversity mode, to transmit the signals in $N_S$ modulated data streams $d_i$, wherein i ranges from 1 to N. The radio signals may be received by $N_R$ receive antennas. Using this transmission method, up to $N_S = \min(N_T, N_R)$ modulated data streams $d_i$ may be transmitted simultaneously, i.e. multiplexed in space.

In one embodiment, the data streams $d_i$ may have been modulated in the transmission device, for example a mobile radio base station, using modulation techniques commonly known to one in the art. The modulated data streams $d_i$ may be precoded using a preceding matrix $P_i$ having $N_T$ lines and $N_S$ columns and then be transmitted using the $N_T$ transmit antennas. The preceding matrices $P_i$ may have complex values. In particular, the preceding matrices $P_i$ may be chosen to originate from the codebook C defined in the 3GPP-LTE standard. The codebook C contains preceding matrices P which satisfy the transmit power constraint:

$$\|P\|^2_F = P_T. \tag{1}$$

The modulated and precoded data streams $P_i d_i$ may then be transmitted over transmission channels having channel transmission characteristics $H_i$. The channel transmission characteristics $H_i$ may be estimated in the transmitter and/or the receiver. According to the channel transmission characteristics $H_i$ the preceding matrices $P_i$ may be selected adaptively. Additionally the modulated, precoded and channel-modulated data streams $H_i P_i d_i$ may be distorted by additive spatially white Gaussian noise $n_i$. The Gaussian noise may in particular be dependent on the signal-to-noise ratio of the transmitted data streams. A receive signal $y_i$ at $N_R$ antennas on subcarrier i may be:

$$y_i = H_i P_i d_i + n_i. \tag{2}$$

Precoding matrices $P_i$ may be selected dependent on the channel characteristics $H_i$. In particular, preceding matrices $P_i$ may be selected such that the data capacity of a MIMO communication link employed by the transmitter is optimally used, i.e. the data rate F of the communication channel is as high as possible. The data rate F of a MIMO communication link may be expressed as $$F(P_i; H_i) = \log_2 \det(1 + H_i P_i P_i^H H_i^H \sigma_n^{-2}), \tag{3}$$

wherein the superscript H denotes the adjoint matrix, i.e. the Hermitian transpose, of the associated matrix, and (n denotes the strength of the additive spatially white Gaussian noise $n_i$. Other choices for the function F describing the data rate may be applicable as well and such variations are contemplated as falling within the scope of the invention.

The data rate F may depend on the choice of preceding matrices $P_i$ and the channel transmission characteristics $H_i$. Different optimization techniques may be utilized to maximize the data rate F. Depending on the receiver used for reception of the receive signal, different techniques may be used to extract the data from the receive signal, for example serial interference cancellation (SIC) or minimizing the mean square error (MMSE). Therefore, the optimization of the data rate may be tailored according to the type of receiver according to various embodiments of the invention. In one embodiment, techniques which minimize the mean square error may be performed by using a linear MIMO equalizer (MMSE equalizer) in the receiver. Assuming a MMSE equalizer in the receiver, the data rate $F_M$ to be optimized may be expressed as $$F_M(P_i; H_i) = \Sigma_{k=1}^{NS} \log_2(1 + SINR_{i,k}) = -\Sigma_{k=1}^{NS} \log_2(\sigma_n^2 [(P_i^H H_i^H H_i P_i + \sigma_n^2 I)^{-1}]_{k,k}), \tag{4}$$

wherein I denotes the unit matrix and $SINR_{i,k}$ the signal-to-interference-and-noise ratio of the k-th data stream on subcarrier i. The optimization therefore may aim to maximize the signal-to-interference-and-noise ratio $SINR_{i,k}$ after equalization (post-equalization SINR) in one embodiment.

In one embodiment, the preceding matrices $P_i$ may be selected such that for each subcarrier a different preceding matrix $P_i$ is chosen. Additionally, for each subcarrier the rank $R_i$ of the associated preceding matrix $P_i$ may be selected independently of the ranks of the remaining subcarriers. If the radio transmission system is operating according to the LTE standard in one embodiment, the ranks $R_i$ of the preceding matrices $P_i$ are all equal to R over the whole frequency band, i.e. the rank R is selected to be constant for each of the preceding matrices $P_i$. If the rank R is selected to be constant, the preceding matrices $P_i$ may be selected from a subset of the entirety of preceding matrices $P_i$. In other words, the selection process for the preceding matrices $P_i$ is restricted to the pool of preceding matrices having the desired rank R.

In one embodiment, selecting preceding matrices $P_i$ may include solving an optimization problem. For different ranks $R_i$ over every subcarrier the optimization problem may be set to $$\max_{\{P_i \in C\}_{i=1}^N} \sum_{i=1}^N F(P_i; H_i) = \max_{\{R_i\}_{i=1}^N} \max_{\{P_i \in C_{R_i}\}_{i=1}^N} \sum_{i=1}^N F(P_i; H_i). \quad (5)$$

For a constant rank R over every subcarrier the optimization problem simplifies to $$\max_R \max_{\{P_i \in C_R\}_{i=1}^N} \sum_{i=1}^N F(P_i; H_i). \quad (6)$$

With the optimization problem given in equation (6) for every possible R, every possible combination of preceding matrices $P_i$ with the corresponding rank R has to be evaluated.

FIG. 1 shows a method according to one exemplary embodiment. First, estimates for the channel transmission characteristics $H_i$ may be generated at 100. The estimates for the channel transmission characteristics $H_i$ may be provided in one embodiment by means commonly known to ones skilled in the art. The generated estimates may be used to select a wideband preceding matrix P of 102. In other words, a preceding matrix P may be selected such that the data rate over the whole frequency band is maximized in one embodiment. In one embodiment, the preceding matrix P may be selected to optimize the expression $$\max_{P \in C} \sum_{i=1}^N F(P; H_i). \quad (7)$$

Solving this particular optimization problem may be performed by using an approximation for the sum in equation (7):

$$\Sigma_{i=1}^N F(P;H_i) \approx F_C(P^H R_{Tx} P), \quad (8)$$

wherein $R_{Tx}$ is the maximum likelihood estimate of the transmit correlation matrix and $F_C(M)$ may, for example, be a cost function defined by $$F_C(M) = \log_2 \det(I + M\sigma_n^{-2}). \quad (9)$$

Other definitions for the cost function may be used as well in alternative embodiments, depending on the type of receiver receiving the receive signal. The particular cost function $F_C(M)$ as described in this embodiment may be considered for serial interference cancellation (SIC) or minimizing the mean square error (MMSE) in the receiver. $R_{Tx}$ (the maximum likelihood estimate of the transmit correlation matrix) may further be defined as $$R_{Tx} = N^{-1}\Sigma_{i=1}^N H_i^H H_i \approx E(H_i^H H), \quad (10)$$

wherein $E(X)$ is the arithmetical mean function of the value X, i.e. the expectation value of the variable X. When selecting the wideband preceding matrix P the optimization problem to be solved may thus be $$\max_{P \in C} \log_2 \det(I + P^H R_{Tx} P \sigma_n^{-2}). \quad (11)$$

The optimization problem given in Equation (10) may describe a system with a SIC receiver. For a linear MMSE receiver, the optimization problem may become $$\min_{P \in C} \sum_{k=1}^{N_S} \log_2 \left( (I + P^H R_{Tx} P \sigma_n^{-2})_{k,k}^{-1} \right), \quad (12)$$

which may be transformed into a minimization problem of the geometric mean of minimum MSEs $$\min_{P \in C} \prod_{k=1}^{N_S} \left( (I + P^H R_{Tx} P \sigma_n^{-2})_{k,k}^{-1} \right). \quad (13)$$

When the wideband preceding matrix P has been selected at 102 of FIG. 1 according to one of the optimization problems given in equations (7), (11), (12) or (13), the rank R of the wideband preceding matrix P may be selected at 104 in one embodiment as the optimized wideband rank R, which may be held constant over the whole frequency band, i.e. over all N subcarriers i. The rank R may alternatively be selected according to the mean transmit correlation matrix $R_{Tx}$ over all subcarriers i. Feedback information regarding the selected wideband preceding matrix P may be output to other components at 106 in the radio transmission system, in particular a preceding matrix index (PMI). Additionally, feedback information regarding the selected rank R may be output to other components at 108 in the radio transmission system. Feedback information regarding the preceding matrix index (PMI) of the selected wideband preceding matrix P and/or the selected rank R may be transmitted to the radio transmitter transmitting the modulated data streams $d_i$ in one embodiment.

In another step, optimization problems similar to optimization problems given in equations (7), (11), (12) and/or (13) may be solved for each subcarrier i. Precoding matrices $P_i$ may be selected at 110 from a subset of preceding matrices $P_i$ having the previously selected rank R according to the optimization problem $$\max_{\{P_i \in C_R\}_{i=1}^N} \sum_{i=1}^{N} F(P_i; H_i). \quad (14)$$

If the optimization problem is to be solved, when a linear MMSE equalizer is assumed in the receiver in one embodiment, the respective optimization problem may be $$\min_{\{P_i \in C_R\}_{i=1}^N} \sum_{k=1}^{N_S} \log_2((I + P_i^H R_{Tx} P_i \sigma_n^{-2})_{k,k}^{-1}). \quad (15)$$

Similarly to equation (13), the optimization problem of equation (15) may be transformed to $$\min_{\{P_i \in C_R\}_{i=1}^N} \prod_{k=1}^{N_S} ((I + P^H R_{Tx} P \sigma_n^{-2})_{k,k}^{-1}). \quad (16)$$

In equations (14) to (16), the subset CR of preceding matrices $P_i$ only contains preceding matrices Pi with the selected rank R. The preceding matrices $P_i$ for each subcarrier i may be selected depending on the mean transmit correlation matrix over the frequencies in the associated subcarrier i. Feedback information on the plurality of selected preceding matrices $P_i$ may be output to other components of the radio transmission system at 112, in particular to the transmitter, i.e. the base station of the radio transmission system. Feedback on the plurality of selected preceding matrices $P_i$ may include preceding matrix indices (PMI) of at least one of the plurality of preceding matrices $P_i$.

Figure 2:
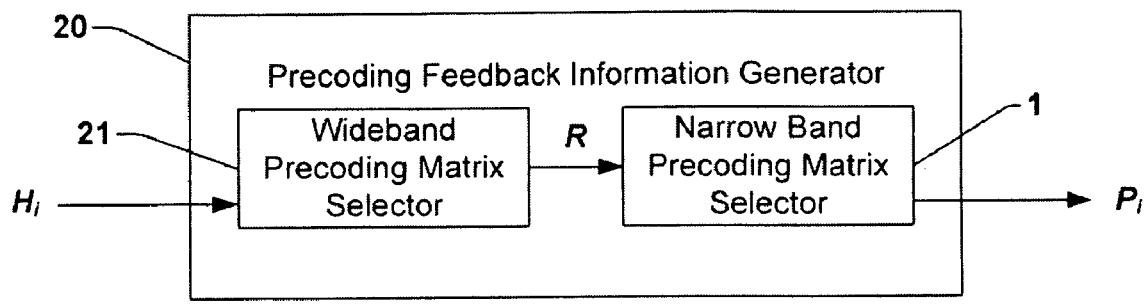
FIG. 2 schematically illustrates a device 20 according to one exemplary embodiment.

In FIG. 2 an apparatus 20 according to one exemplary embodiment is shown. The apparatus 20 may be a preceding feedback information generator configured to generate preceding feedback information in a radio transmission system such as a MIMO communication system operable in an OFDM mode. The apparatus 20 may include a wideband preceding matrix selector 21 and a narrow band preceding matrix selector 1. The wideband preceding matrix selector 21 may be fed with estimates of the channel transmission characteristics $H_i$ and may output a selected wideband preceding matrix P having a selected rank R to the narrow band preceding matrix selector 1. The narrow band preceding matrix selector 1 may be configured to output a plurality of narrow band preceding matrices $P_i$ for each subcarrier i of the radio transmission system and to output feedback information on the plurality of narrow band preceding matrices $P_i$ for each subcarrier i, in particular preceding matrix indices (PMI). The apparatus 20 may be configured to perform a method as illustrated in FIG. 1 in one embodiment.

Figure 3:
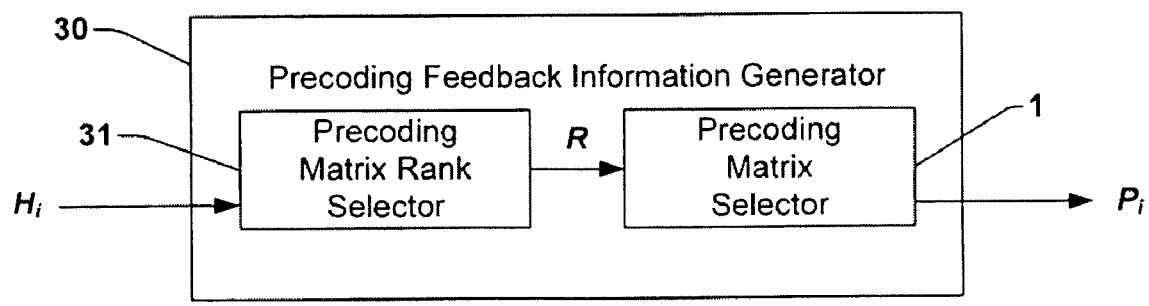
FIG. 3 schematically illustrates a device 30 according to one exemplary embodiment.

In FIG. 3 an apparatus 30 according to one exemplary embodiment is shown. The apparatus 30 may be a preceding feedback information generator configured to generate preceding feedback information in a radio transmission system such as a MIMO communication system operable in an OFDM mode. The apparatus 30 may include a preceding matrix rank selector 31 and a preceding matrix selector 1. The preceding matrix rank selector 31 may be fed with estimates of the channel transmission characteristics $H_i$ and may output a selected rank for a preceding matrix P to the preceding matrix selector 1. The preceding matrix selector 1 may be configured to output a plurality of preceding matrices $P_i$ having the selected rank R output by the preceding matrix rank selector 31 for each subcarrier i of the radio transmission system, and further configured to output feedback information on the plurality of narrow band preceding matrices Pi for each subcarrier i, such as preceding matrix indices (PMI) in one embodiment. The apparatus 30 may in particular be configured to perform a method as illustrated in FIG. 1.

Figure 4:
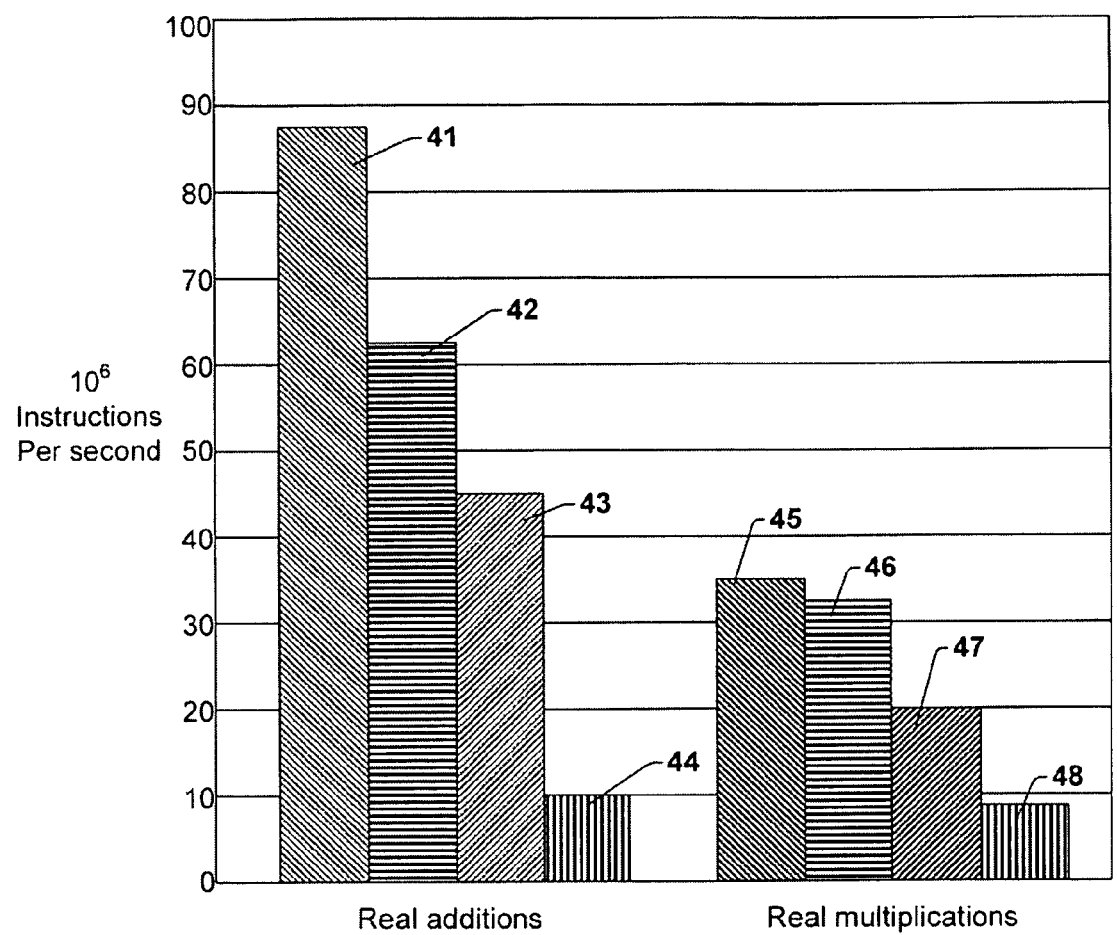
FIG. 4 is a graph illustrating a pillar diagram.

In FIG. 4 a graph illustrating a pillar diagram is shown. As an example, an LTE system with a 2×4 MIMO link having four transmit antennas and two receive antennas, i.e. $N_T=4$, $N_R=2$, and 1200 subcarriers divided in sub-bands of 48 subcarriers each is contemplated. The preceding matrices have been selected from the preceding codebook C with a minimum feedback period of 1 ms.

Pillars 41 to 48 represent the amounts of real value operations in million instructions per second for different real value operations in different computational methods. Pillars 41 to 44 show the amounts of real value additions in different computational methods. Pillar 41 represents the number of real value additions, when evaluating preceding matrices Pi for each sub-band of subcarriers according to equation (4) using a linear MMSE equalizer without evaluating a wideband preceding matrix P having a constant rank R before. The associated optimization problem to be solved is given in equation (6). Pillars 42 and 43 each represent the number of real value additions when solving an optimization problem as given in equation (15), where narrow band preceding matrices Pi are selected, wherein pillar 42 represents the worst assumable case and pillar 43 represents the best assumable case. Both pillar 42 and pillar 43 show a considerably lower number of real value additions than pillar 41, since for the optimization problem of equation (15) a considerably lower amount of function evaluations is necessary than for the optimization problem of equation (6). Pillar 44 represents the number of real value additions when solving an optimization problem as given in equation (13), where an optimized wideband preceding matrix P over a whole frequency band is selected.

Pillars 45 to 48 represent respective numbers as pillars 41 to 44, respectively, for real value multiplications instead of real value additions. Again, the number of real value additions for pillar 45 is higher than the number of real value additions for pillars 46 and 47.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

The invention claimed is:

1. A method for generating precoding feedback information in a multiple frequency radio transmission system, comprising:
   selecting a rank for precoding matrices, wherein the rank is constant over a frequency subset of the multiple frequencies; and
   selecting a plurality of precoding matrices having the selected rank, wherein a different precoding matrix is selected for each of a plurality frequency subsets of the multiple frequencies,
   wherein selecting the rank for precoding matrices comprises:
      selecting a wideband precoding matrix that is constant over the frequency band of the multiple frequencies; and
      determining the rank of the selected wideband precoding matrix to be the selected rank.

2. The method of claim 1, wherein the number of frequencies in each frequency subset of the multiple frequencies is greater than one.

3. The method of claim 1, wherein the number of frequencies in each frequency subset of the multiple frequencies is one.

4. The method of claim 1, wherein each precoding matrix of the plurality of precoding matrices is selected according to the 3GPP-LTE standard.

5. The method of claim 1, wherein selecting the rank and selecting the plurality of precoding matrices comprises selecting the rank and the plurality of precoding matrices to optimize the data rate in the multiple frequency radio transmission system.

6. An apparatus for generating precoding feedback information in a multiple frequency radio transmission system, comprising:
   a first device configured to select a rank for precoding matrices, wherein the rank is constant over a frequency subset of the multiple frequencies; and
   a second device configured to select a plurality of precoding matrices having the selected rank, wherein a different precoding matrix is selected for each of a plurality of frequency subsets of the multiple frequencies,
   wherein the first device is configured to select a wideband precoding matrix that is constant over the multiple frequencies, and further configured to determine the rank of the selected wideband precoding matrix to be the selected rank.

7. The apparatus of claim 6, wherein the selected plurality of precoding matrices are used to precode a transmission signal to be transmitted by the multiple frequency radio transmission system.

8. The apparatus of claim 6, wherein the first device and the second device comprise optimization units configured to optimize the data rate in the multiple frequency radio transmission system.

9. An apparatus for generating precoding feedback information in a multiple frequency radio transmission system, comprising:
   a first device configured to select a rank for precoding matrices, wherein the rank is constant over a frequency subset of the multiple frequencies; and
   a second device configured to select a plurality of precoding matrices having the selected rank, wherein a different precoding matrix is selected for each of a plurality of frequency subsets of the multiple frequencies,
   wherein the selected plurality of precoding matrices are used to precode a transmission signal to be transmitted by the multiple frequency radio transmission system, and
   wherein the transmission signal is assumed to be received by a receiver comprising a linear minimum mean square error (MMSE) equalizer evaluating the signal-to-interference-plus-noise ratio over the multiple frequencies.

10. An apparatus for generating precoding feedback information in a multiple frequency radio transmission system, comprising:
   a first device configured to select a rank for precoding matrices, wherein the rank is constant over a frequency subset of the multiple frequencies; and
   a second device configured to select a plurality of precoding matrices having the selected rank, wherein a different precoding matrix is selected for each of a plurality of frequency subsets of the multiple frequencies,
   wherein the selected plurality of precoding matrices are used to precode a transmission signal to be transmitted by the multiple frequency radio transmission system, and
   wherein the transmission signal is assumed to be received by a receiver comprising a linear minimum mean square error (MMSE) equalizer evaluating the signal-to-interference-plus-noise ratios for each of the frequency subsets of the multiple frequencies.

* * * * *

UNITED STATES PATENT AND TRADEMARK OFFICE
CERTIFICATE OF CORRECTION

PATENT NO. : 8,204,453 B2  Page 1 of 1
APPLICATION NO. : 12/194640
DATED : June 19, 2012
INVENTOR(S) : Frank Dietrich It is certified that error appears in the above-identified patent and that said Letters Patent is hereby corrected as shown below:

Title page, Item (57) In the Abstract, line 2; please replace "preceding" with --precoding--
Title page, Item (57) In the Abstract, line 3; please replace "preceding" with --precoding--
Title page, Item (57) In the Abstract, line 5; please replace "preceding" with --precoding--
Title page, Item (57) In the Abstract, line 6; please replace "preceding" with --precoding--

Signed and Sealed this
Thirty-first Day of July, 2012

David J. Kappos
*Director of the United States Patent and Trademark Office*